(12) United States Patent
Kar et al.

(10) Patent No.: US 12,383,870 B2
(45) Date of Patent: Aug. 12, 2025

(54) ENGINEERED COATING FOR FILTERS AND METHODS OF MANUFACTURE THEREOF

(71) Applicant: Mott Corporation, Farmington, CT (US)

(72) Inventors: Piyush Kar, New Britain, CT (US); Venkat Subramaniam Venkataramani, Clifton Park, NY (US); Aravind Mohanram, Avon, CT (US)

(73) Assignee: MOTT CORPORATION, Farmington, CT (US)

( * ) Notice: Subject to any disclaimer, the term of this patent is extended or adjusted under 35 U.S.C. 154(b) by 0 days.

(21) Appl. No.: 17/533,350

(22) Filed: Nov. 23, 2021

(65) Prior Publication Data

US 2022/0161202 A1    May 26, 2022

Related U.S. Application Data

(60) Provisional application No. 63/118,126, filed on Nov. 25, 2020.

(51) Int. Cl.
  *B01D 69/10*    (2006.01)
  *B01D 67/00*    (2006.01)
  (Continued)

(52) U.S. Cl.
  CPC ....... *B01D 69/108* (2022.08); *B01D 67/0044* (2013.01); *B01D 69/02* (2013.01);
  (Continued)

(58) Field of Classification Search
  CPC .. B01D 69/02; B01D 67/0044; B01D 71/022; B01D 2323/08; B01D 2323/10;
  (Continued)

(56) References Cited

U.S. PATENT DOCUMENTS

| | | |
|---|---|---|
| 4,888,114 A | 12/1989 | Gaddis et al. |
| 5,186,833 A | 2/1993 | McHenry et al. |

(Continued)

FOREIGN PATENT DOCUMENTS

CN   107930414 A  *  4/2018  ......... B01D 67/0044

OTHER PUBLICATIONS

International Search Report for International Application No. PCT/US21/60540; International Filing Date Nov. 23, 2021; Date of Mailing Feb. 28, 2022; 2 pages.
Written Opinion for International Application No. PCT/US21/60540; International Filing Date Nov. 23, 2021; Date of Mailing Feb. 28, 2022; 6 pages.

*Primary Examiner* — Krishnan S Menon
(74) *Attorney, Agent, or Firm* — CANTOR COLBURN LLP (57) ABSTRACT

Disclosed herein is a porous membrane comprising a porous substrate; a porous ceramic coating disposed on the porous substrate; where an average pore size of pores in the porous substrate are larger than an average pore size of pores in the porous coating. Disclosed herein is a method of manufacturing a porous membrane comprising disposing upon a porous substrate a porous ceramic coating, where the porous ceramic coating has an average pore size that is less than an average pore size of the porous substrate.

21 Claims, 3 Drawing Sheets

(51) Int. Cl.
*B01D 69/02* (2006.01)
*B01D 71/02* (2006.01)

(52) U.S. Cl.
CPC . *B01D 71/02231* (2022.08); *B01D 71/02232* (2022.08); *B01D 2323/08* (2013.01); *B01D 2323/10* (2013.01); *B01D 2325/0283* (2022.08); *B01D 2325/04* (2013.01)

(58) Field of Classification Search
CPC .............. B01D 2325/02; B01D 2325/04; B01D 69/10; B01D 69/12
See application file for complete search history.

(56) References Cited

U.S. PATENT DOCUMENTS

| | | |
|---|---|---|
| 5,773,103 A | 6/1998 | Ciora, Jr. et al. |
| 6,432,308 B1 | 8/2002 | Gill |
| 10,364,169 B2 * | 7/2019 | Chaplin ................. B01D 69/02 |
| 2002/0142172 A1 | 10/2002 | Brinker et al. |
| 2010/0264060 A1 * | 10/2010 | Tan ................. C10M 175/0058 |
| | | 208/179 |
| 2010/0300960 A1 | 12/2010 | Hishiki et al. |
| 2011/0293917 A1 | 12/2011 | Bookbinder et al. |
| 2019/0161415 A1 | 5/2019 | Clinton et al. |

\* cited by examiner

ENGINEERED COATING FOR FILTERS AND METHODS OF MANUFACTURE THEREOF

CROSS REFERENCE TO RELATED APPLICATIONS

This application claims the benefit of U.S. Provisional Application No. 63/118,126, filed Nov. 25, 2020, both of which are incorporated by reference in their entirety herein.

BACKGROUND

This disclosure relates to an engineered coating for filters and methods of manufacture thereof.

To-date, there is very limited or no evidence of porous products that can be used to meet the flow/filtration requirements at high temperatures and a wide range of pH's. The current oxide coated porous metal substrates used for micro and nano filtration use a reduced atmosphere firing in atmospheres such as forming gas or dry $H_2$ (at pO2 less than $10^{-9}$ atm) that produces a reduced oxide coating.

It is desirable to manufacture these porous filters either under normal ambient atmospheric conditions where the oxygen supply is not reduced in any manner so as to reduce the oxide coating, or under inert atmosphere (typically argon or nitrogen) with very low partial pressure (greater than $10^{-9}$ atm) of air/oxygen.

SUMMARY

Disclosed herein is a porous membrane comprising a porous substrate; a porous ceramic coating disposed on the porous substrate; where an average pore size of pores in the porous substrate are larger than an average pore size of pores in the porous coating.

Disclosed herein is a method of manufacturing a porous membrane comprising disposing upon a porous substrate a porous ceramic coating, where the porous ceramic coating has an average pore size that is less than an average pore size of the porous substrate.

DETAILED DESCRIPTION

Disclosed herein is a porous membrane that comprises a porous metal substrate having disposed thereon a porous ceramic coating whose average pore size is less than that of the average pore size of the substrate. The porous membrane thus prepared can be used for filtration and can withstand high temperatures in harsh conditions. For example, the porous membrane can be used in hostile environments for filtration of fluids that contain erosive, corrosive and/or abrasive media. Disclosed herein too is a method for manufacturing the aforementioned porous membrane. The methods comprise fabricating the membrane under normal atmospheric oxygen conditions and/or below the oxidation temperatures of the substrate, while not reducing the oxide coating; fabricating the membrane in inert atmospheres (under exposure to argon and/or nitrogen) with low air/oxygen partial pressures and at temperatures between 1000 and 1200° C. The oxygen partial pressure is from $10^{-9}$ atmospheres (atm) to $10^{-3}$ atm, preferably $10^{-8}$ to $10^{-4}$ atm and more preferably $10^{-7}$ to $10^{-5}$ atm.

Figure 1:
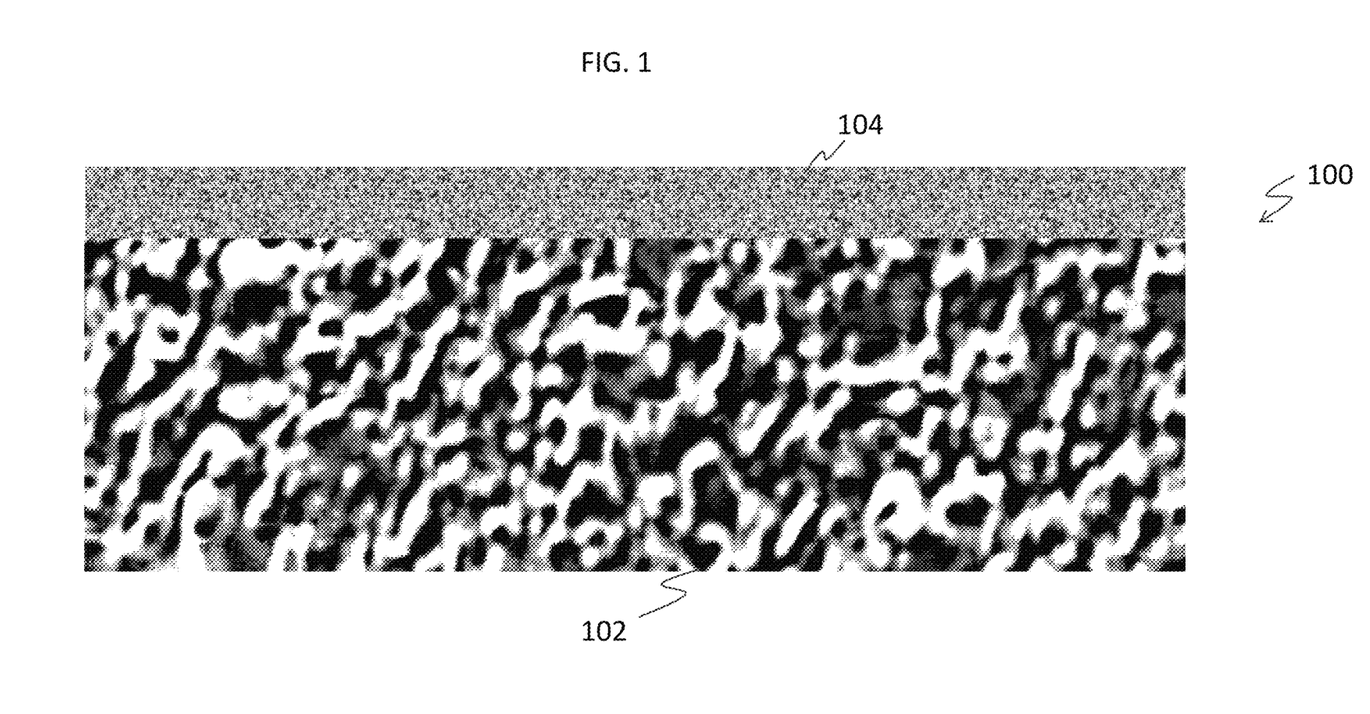
FIG. 1 is an exemplary depiction of a porous membrane comprising the porous substrate and the porous ceramic coating.

FIG. 1 depicts a photomicrograph of the porous membrane 100 that comprises the porous substrate 102 upon which is disposed the porous ceramic coating 104.

Porous Substrate

The porous substrate 102 forms the base layer of the porous membrane. The porous substrate comprises a material which can withstand further processing of the membrane under normal atmospheric oxygen concentrations (and does not undergo further oxidation) and/or firing temperatures between 1000 and 1200° C. under exposure to an inert atmospheres.

In an embodiment, manufacturing the membrane (e.g., casting and/or machining) is conducted in an inert atmosphere with low air/oxygen partial pressures and at temperatures between 1000 and 1200° C. In an alternative embodiment, the manufacturing of the porous membrane is conducted below an oxidation temperature of the substrate, while not reducing any existing oxide coating (i.e., not subjecting the oxide coating to a reducing gas such as hydrogen) on the membrane.

In other words, the membrane (including the substrate) is manufactured temperatures that are lower than previously used manufactured temperatures for equivalent commercially available membranes. The atmosphere used in the manufacture is not a reducing atmosphere. In an embodiment, the atmosphere used is preferably an inert atmosphere.

The porous substrate is preferably a sintered porous metal or alloy of average pore-size ranging from 0.1 to 100 microns. The substrate has open porosity to permit through-flow of fluids. In other words, the pores are interconnected to form pathways (even after the porous ceramic coating is disposed thereon) that permit a fluid to pass through the porous membrane while at the same time preventing other undesirable matter from being transported through the membrane.

In an embodiment, at least 80% of the pores are open pores, preferably at least 90% of the pores are open pores, and more preferably at least 95% of the pores are open pores. It typically has an average pore sizes of 0.1 to 100 micrometers, preferably 5 to 90 micrometers, and more preferably 10 to 50 micrometers. The porosity can also be oriented as radial channels. The porous substrate may be thicker than the porous ceramic coating or alternatively, it may be thinner than the porous ceramic coating.

In an embodiment, the porous ceramic coating may or may not protrude into the porous substrate. In another embodiment, the porous ceramic coating does protrude into the porous substrate (i.e., there is an interfacial region between the porous ceramic coating and the porous substrate). In yet another embodiment, the porous ceramic coating does not protrude into the porous substrate (i.e., there is no interfacial region between the porous ceramic coating and the porous substrate).

The material used in the porous metal substrate is structurally and chemically stable at temperatures of at least 500° C. under atmospheric oxygen conditions. The porous substrate may comprise a metal, a ceramic and/or glass (including cementitious and reinforced ceramics), a cermet, or the like, or a combination thereof. The material used in the porous substrate should not react with the materials (e.g., the solute, the filtrate, or the like) to be filtered.

Suitable metals for use in the porous substrate include iron, aluminum, titanium, nickel, chromium, cobalt, copper, gallium, gold, silver, platinum, palladium, chromium, manganese, magnesium, silicon, vanadium, zinc, zirconium, or alloys thereof. Non-metallic elements may also be added to the aforementioned metals for improved properties (mechanical strength, formability, etc.) Such non-metals may include carbon, phosphorus, boron, helium, hydrogen, or the like, or a combination thereof.

Alloys are preferred. Suitable alloys are stainless steel, carbon steel, titanium-aluminum alloys, ferroalloys, ferroboron, ferrochrome (chromium), ferromagnesium, ferromanganese, ferromolybdenum, ferronickel, ferrophosphorus, ferrotitanium, ferrovanadium, ferrosilicon, Al—Li (aluminum, lithium, sometimes mercury), Alnico (aluminum, nickel, copper), Duralumin (copper, aluminum), Magnalium (aluminum, 5% magnesium), Magnox (magnesium oxide, aluminum), Nambe (aluminum plus seven other unspecified metals), Silumin (aluminum, silicon), Billon (copper, silver), Brass (copper, zinc), Calamine brass (copper, zinc), Chinese silver (copper, zinc), Dutch metal (copper, zinc), Gilding metal (copper, zinc), Muntz metal (copper, zinc), Pinchbeck (copper, zinc), Prince's metal (copper, zinc), Tombac (copper, zinc), Bronze (copper, tin, aluminum, or any other element), Alumel (nickel, manganese, aluminum, silicon), Chromel (nickel, chromium), Cupronickel (nickel, bronze, copper), German silver (nickel, copper, zinc), Hastelloy (nickel, molybdenum, chromium, sometimes tungsten), Inconel (nickel, chromium, iron), Monel metal (copper, nickel, iron, manganese), Mu-metal (nickel, iron), Ni—C(nickel, carbon), Nichrome (chromium, iron, nickel), Nicrosil (nickel, chromium, silicon, magnesium), Nisil (nickel, silicon), Nitinol (nickel, titanium, shape memory alloy), or the like, or a combination thereof.

Enamel steels may also be used for manufacturing the porous substrate. Enamel steels are obtained by rolling with specially roughened rolls on the cold mill and the temper mill. Different finishes can be provided to maintain effective lubrication during metal forming or to satisfy specific part/customer specifications. Preferred alloys for use in the porous substrate are those derived from iron (e.g., steel) and nickel.

The metals and/or metal alloys used for the porous substrate may also include reinforcing agents. Suitable reinforcing agents include carbon fibers (derived from pitch and PAN), glass fibers, carbon nanotubes, carbon black, polyaramid fibers (e.g., KEVLAR, NOMAX, or the like), woven and non-woven fibers of the aforementioned types), or the like, or a combination thereof.

Glass or ceramic substrates can include an oxide, a carbide, an oxycarbide, a nitride, an oxynitride, a boride, a borocarbide, a boronitride, a silicide, an iodide, a bromide, a sulfide, a selenide, a telluride, a fluoride or a borosilicide of a metal or a metal alloy. Ceramic substrates can also comprise a mixture of two or more of the following: an oxide, a carbide, a oxynitride, a nitride, a oxynitride, a boride, a borocarbide, a boronitride, a silicide, an iodide, a bromide, a sulfide, a selenide, a telluride, a fluoride or a borosilicide of the metal or the metal alloy.

Preferred glasses and ceramics for use in the porous substrates are metal oxides. Glasses and ceramics that may be used in the porous substrate include silica, alumina, zirconia, titania, ceria, quartz, or the like, or a combination thereof. The porous ceramics and glasses may also be reinforced with the reinforcing agents listed above. It is to be noted that the glass or ceramic materials used in the glass or ceramic substrates may also be used in the porous ceramic coating. In an embodiment, the composition of the porous substrate may be the same or different from that of the porous ceramic coating with the exception that the pore sizes are different. In a preferred embodiment, the composition of the porous substrate is different from that of the porous ceramic coating.

Cermets may also be used as the porous substrates. A cermet is a composite material composed of ceramic (cer) and metal (met) materials. Cermets are designed to have the optimal properties of both a ceramic, such as high temperature resistance and hardness, and those of a metal, such as the ability to undergo plastic deformation. The metal is used as a binder for an oxide, boride, or carbide. Generally, the metallic elements used are nickel, molybdenum, and cobalt. Depending on the physical structure of the material, cermets can also be metal matrix composites, but cermets are usually less than 20% metal by volume.

Cermets comprising some of the metals listed above and some of the ceramics listed above can be used as the porous substrate. Preferred metals for use in porous substrate cermets are iron, nickel, cobalt, or the like, or a combination thereof. Preferred ceramics for use in the porous substrate cermets are carbides, nitrides, borides, silicides and oxides.

The porous substrate may be in the form of tubes, discs, plates, sheets, or the like. The porous substrate has a volumetric porosity of 50 to 95 volume percent, preferably 70 to 90 volume percent, based on the total volume of the porous substrate.

The porous substrate may be manufactured by mixing materials used for the substrate (e.g., metals, metal alloys, glass, ceramics, cermets, or the like) with a blowing agent or with a disposable phase (e.g., degradable polymers). During casting, the blowing agent expands producing pores. Alternatively, when a disposable phase material is mixed with metal particles, the disposable phase degrades and evaporates during a sintering process to produce the porous substrate.

As noted above, the porous substrate comprises a foam. Foams are commonly made by injecting a gas or mixing a foaming agent into a molten metal, glass, ceramic or cermets. Melts can be foamed by creating gas bubbles in the material. Normally, bubbles in molten material are highly buoyant in the high-density liquid and rise quickly to the surface. This rise can be slowed by increasing the viscosity of the molten material by adding other materials (e.g., ceramics or other alloying metals) that form stabilizing particles in the melt, or by other means. Metallic melts can be foamed in one of three ways:
  a) by injecting gas into the liquid metal from an external source;
  b) by causing gas formation in the liquid by admixing gas-releasing blowing agents with the molten metal; or
  c) by causing the precipitation of gas that was previously dissolved in the molten metal.

To stabilize the molten metal bubbles, high temperature foaming agents (nano- or micrometer-sized solid particles) are used. When foaming or blowing agents are used, they are mixed with the powdered metal before it is melted. This is the so-called "powder route" of foaming, and it is probably the most established (from an industrial standpoint). After metal (e.g. aluminium) powders and foaming agent (e.g. $TiH_2$) have been mixed, they are compressed into a compact, solid precursor, which can be available in the form of a billet, a sheet, or a wire. Production of precursors can be done by a combination of materials forming processes, such as powder pressing, extrusion (direct or conform) and flat rolling.

The porous substrate may be manufactured in a single step process or in a multiple step process. The single step process is used when ceramic or glass substrates are manufactured and comprises using a blowing agent in conjunction with the glass or ceramic particles. The blowing agent undergoes expansion during an annealing or sintering process to provide the substrate with the desired porosity.

The two step process is typically used when metal particles are sintered to form the porous substrate. In the first step, foaming or blowing agents are mixed with the powdered metal before it is melted. In the next step, the powders are placed in a mold and subjected to elevated temperatures and pressures to produce the desired shape.

Porous Ceramic Coating

The porous ceramic coating 104 typically has a thickness of 1 to 100 micrometers, preferably 10 to 70 micrometers, and more preferably 15 to 50 micrometers. The porous ceramic coating 104 is disposed on a surface of the porous substrate 102. The porous ceramic coatings can be enamel based compositions, dip coated compositions, sol gel compositions, sputtered coatings, or a combination thereof.

The porous ceramic coating 104 is a foamed ceramic having an average pore-sizes from 0.05 nanometers to 5 micrometers, preferably 0.5 to 4 micrometers, and more preferably 1 to 3 micrometers. In an embodiment, the porous ceramic coating may diffuse into the porous substrate and may coat a portion of the internal cell walls of the porous substrate. In an embodiment, the porous ceramic coating may diffuse through the porous substrate and coat a substantial portion of the internal cell walls of the porous substrate. The depth of penetration (diffusion) of the porous ceramic coating into the porous substrate depends on average pore-size of substrate and also on the chemistry of the substrate being coated. In other words, substrate can be pre-conditioned to control penetration depth of coating.

The porous ceramic coating may comprise an oxide, a nitride, a carbide, a silicate, a titanate, a zirconate, or a combination thereof. The porous ceramic coating may comprise a metal oxide, a metal nitride, a metal carbide, a silicate, a titanate, a zirconate, an aluminate, or a combination thereof. Various materials that may be used in the ceramic coating are described below.

Silicates

Silicates that may be used as substrates or coatings include metal silicates wherein the metals are from Group 2A of the Periodic Table, i.e., beryllium (Be), magnesium (Mg), calcium (Ca), strontium (Sr), barium (Ba) and radium (Ra). Preferred metal silicates include $Mg_2SiO_4$, $CaSiO_3$, $BaSiO_3$ and $SrSiO_3$. In addition to Group 2A metals, the present metal silicates may include metals from Group IA, i.e., lithium (Li), sodium (Na), potassium (K), rubidium (Rb), cesium (Cs) and francium (Fr). For example, metal silicates may include sodium silicates such as $Na_2SiO_3$ and $NaSiO_{3-5}H_2O$, lithium silicates such as $LiAlSiO_4$, $Li_2SiO_3$ and $Li_4SiO_4$. Additional metal silicates may include $Al_2Si_2O_7$, $ZrSiO_4$, $KAlSi_3O_8$, $NaAlSi_3O_8$, $CaAl_2Si_2O_8$, $CaMgSi_2O_6$, $BaTiSi_3O_9$, $Zn_2SiO_4$ or a combination comprising at least one of the foregoing silicates.

Oxides

Exemplary oxides include zirconates, titanates, aluminates, stannates, niobates, tantalates and rare earth oxides. Exemplary inorganic oxides include silica, aluminum oxide, silicon dioxide, calcium oxide, cerium oxide, copper oxide, titanium oxide, zinc oxide, zirconium oxide, tantalum oxide, niobium oxide, yttrium oxide, magnesium oxide, $Mg_2SiO_4$, MgO, $CaTiO_3$, $MgZrSrTiO_6$, $MgTiO_3$, $MgAl_2O_4$, $WO_3$, $SnTiO_4$, $ZrTiO_4$, $CaSiO_3$, $CaSnO_3$, $CaWO_4$, $CaZrO_3$, $MgTa_2O_6$, $MgZrO_3$, $MnO_2$, PbO, $Bi_2O_3$ and $La_2O_3$, $CaZrO_3$, $BaZrO_3$, $SrZrO_3$, $BaSnO_3$, $CaSnO_3$, $MgSnO_3$, $Bi_{2}O_{3/2}SnO_2$, $Nd_2O_3$, $Pr_7O_{11}$, $Yb_2O_3$, $Ho_2O_3$, $La_2O_3$, $MgNb_2O_6$, $SrNb_2O_6$, $BaNb_2O_6$, $MgTa_2O_6$, $BaTa_2O_6$, $Ta_2O_3$, or the like, or a combination comprising at least one of the foregoing oxides. Exemplary metal oxides include $Mg_2SiO_4$, MgO, $CaTiO_3$, $MgZrSrTiO_6$, $MgTiO_3$, $MgAl_2O_4$, $MgTa_2O_6$, $MgZrO_3$, or the like, or a combination comprising at least one of the foregoing inorganic oxides.

Mixtures of Carbides, Nitrides and Oxides

The ceramic materials can be of the various physical forms of each type listed above and the particles may be hybrids of the materials mentioned and have stoichiometric and non-stoichiometric mixed oxides, nitrides and carbides. More specific examples of these include $Al_2O_3$, AlN, MgO, ZnO, BeO, BN, $Si_3N_4$, SiC, SiO, and $SiO_2$ with mixed stoichiometric and non-stoichiometric combinations.

Exemplary Ceramic Materials

Other examples of the materials that may be used in the porous ceramic coating are listed above under glass or ceramic substrates. Exemplary ceramics include oxides (e.g., alumina, magnesia, zirconia, titania, silica, antimony tin oxide, barium titanate, calcium copper titanate, lead titanate, lead magnesium titanate, barium neodymium titanate, lead zirconium titanate, strontium titanate, calcium titanate, or the like), nitrides (e.g., boron nitride, hexagonal boron nitride, aluminum nitride, silicon nitride, or the like), carbides (e.g., silicon carbide, titanium carbide, zirconium carbide, or the like) or a combination thereof.

The various types of porous ceramic coatings are now detailed below.

Enamel Based Compositions

Enamel based compositions are based on porcelain enamel coating technologies. Typically porcelain enamel coatings comprise at least two layers of coatings: the first layer or "ground coat" is used to form an adhered layer of a ceramic coating; and b) a second layer that is disposed on the first layer; the second layer being a top-coat.

The first layer comprises a suitable glass frit and fillers. A frit is defined as the calcined or partly fused materials of which glass is made. The frit composition comprises alkali and alkaline earth borosilicate glasses that may also have certain oxygen donors such as antimony pentoxide, molybdenum oxide, that will oxidize the metal substrate and form cohesively bonded compound and or oxide compound forming elements such as transition metal oxides (oxides of Co, Mn, Ni, Cr) that form spinel compounds in reaction with the iron in the ferritic substrate. These frits may be combined with fillers such as silica, and clay and other compounds such as alkali nitrites, borax, alkaline earth chlorides in minor quantities to act as electrolytes that promote coating adhesion and keep the particle slurry in a well admixed and dispersed state.

The second layer of the enamel coating is known as the top-coat. The top-coat comprises a suitable alkali/alkaline earth borosilicate/phosphate glass frit powder and fillers selected for the functionality of the coating so as to provide, color, acid/alkali resistance, refractoriness, texture, hydrophobicity, corrosion and erosion resistance.

The respective glass frits (in the first layer and the second layer) are designed to have a good expansion match with both—the substrate and with each other and a softening range and viscosity that permits the respective coatings to flow and form a dense enamel coating.

Two processes are used in coating these enamels—two coat-two fire and two coat-one fire. The former uses a ground coat which is fired to form the adhesive layer and then the top-coat which is applied on the ground coat and fired to react with the ground coat for adhesion and form the desired functional top layer. In a two coat-one fire process in which both the coats are applied and a single firing is carried out to form the enamel coating. Alternately a two coat-one fire wet or dry enameling can also be employed to achieve the desired coating.

Coatings are also accomplished via electrostatic coating with dry powder admixtures and fired to the from the desired finish.

In forming an enamel based porous ceramic coating, a suitable ground coat enamel is first coated on to the porous substrate by techniques such as flow through or dip coating and sintered to form an impervious and bonded ground coat (on the substrate) to prevent oxidation. The resistant top-coat comprising functional oxide particles in a frit-based binder system is then disposed onto the ground coat. The DSP (dilatometric softening point) of the fit will be optimized so that the densification can be done below the firing temperature of the ground coat.

The top-coat is also applied by known techniques such as flow through or dip coating. The top-coat can be fired at a suitable temperature under normal ambient atmospheric conditions to sinter and bond it to the porous substrate to form the porous membrane. The thickness of the coating and particle size of the oxide filler(s) and the frit will be optimized to yield a porous membrane with the desired pore size.

These ground coat compositions generally comprise a glassy component and an additive component. These ground coat compositions have been discovered to be particularly well suited for use with the enamel compositions described herein. Moreover, it is also contemplated that the various ground coat compositions can be used in conjunction with one or more other top-coat or cover coat formulations.

The glass component of the ground coat compositions preferably comprises a combination of one or more alkali oxides represented as $R_2O$, one or more alkaline earth oxides represented as RO, and one or more various transition metal oxides represented herein as MO, $MO_2$, and $M_2O_3$.

The formula $R_2O$ represents alkali oxides, preferably selected from the group consisting of $Li_2O$, $Na_2O$, and $K_2O$.

The formula RO represents alkaline earth oxides, preferably selected from the group consisting of MgO, CaO, SrO, and BaO.

The formulas MO, $MO_2$, and $M_2O_3$ represent transition metal oxides. MO includes NiO, CuO, and $Fe_2O_3$ for example. $MO_2$ includes $TiO_2$, $ZrO_2$, and $MnO_2$ for example. And, $M_2O_3$ includes $Co_2O_3$ for example. It will be appreciated that M can be any transition metal as known in the art.

Preferably, the glass component of the ground coat compositions comprises, prior to firing, from about 14.4% to about 18.4% of one or more $R_2O$; from about 8.5% to about 11.7% of one or more RO; from about 2.5% to about 5.3% of one or more MO; from about 4.0% to about 9.2% of one or more $MO_2$; from about 0.4% to about 1.4% of one or more $M_2O_3$; from about 16.0% to about 17.2% of $B_2O_2$; from about 2.0% to about 5.0% of $Al_2O_3$; and from about 41.8% to about 46.2% of $SiO_2$.

In an embodiment, the glass component of the enamel compositions comprises, prior to firing, from about 10.0% to about 20.0% and more preferably from about 14.1% to about 15.6% of one or more $R_2O$; from about 2.7% to about 3.3% of one or more RO; from about 0.6% to about 2.8% of one or more MO; from about 15.1% to about 17.6% of one or more $MO_2$; from about 0.1% to about 6.3% of one or more $M_2O_3$; from about 19.3% to about 20.7% of $Al_2O_3$; from about 10.8% to about 11.8% of $SiO_2$; and from about 29.2% to about 31.3% of $P_2O_5$.

The top-coat compositions prior to firing, comprise (i) a glass component that includes from about 7.1% to about 7.9% $Na_2O$, from about 7.0% to about 7.7% $K_2O$, from about 0.6% to about 1.0% ZnO, from about 2.7% to about 3.3%, BaO, from about 19.3% to about 20.7% $Al_2O_3$, from about 10.8% to about 11.8% $SiO_2$, from about 0.7% to about 1.2% $TiO_2$, from about 14.4% to about 15.6% $ZrO_2$, from about 29.2% to about 31.3% $P_2O_5$, and from about 0.1% to about 5.2% $Co_2O_3$, and (ii) an effective amount of at least one additive.

In another embodiment, a porcelain enameled steel sheet comprises an aluminum/zinc alloy-plated steel sheet and a porcelain enamel top-coat layer as the upper most layer of the steel sheet, wherein an interstitial layer having good adhesion to an acid resistant ground coat layer and the enamel coating layer is sandwiched between these two layers. The intermediate layer is preferably a member selected from the group consisting of: (1) the surface layer on the aluminum/zinc alloy-plating layer, whose aluminum content is not less than 96% by weight; (2) the surface layer on the aluminum-zinc alloy-plating layer, which comprises aluminum, nickel and not more than 1% by weight of zinc; (3) a coating layer comprising at least one member selected from the group consisting of Ni, Co, Mo, Mn, Ni—P, Ni—Co—P and Co—P; (4) a chromate layer; and (5) a coating layer comprising at least one member selected from the group consisting of zinc phosphate, manganese phosphate and aluminum phosphate. The porcelain enameled steel sheet is excellent in both corrosion resistance and enamel-adhesive properties and can thus be used in various fields, in particular, in the field wherein it is post-processed through bending.

In an embodiment, the acid resistant ground coat and/or top coat frits or ground coat and/or top coat enamels can be tailored with fillers and processing conditions to get to a matte fired and micro/nano porous state. Typically acid resistant frits are high silica glasses (silica>30 wt %) containing titania. Acid resistant enamels contain resistant and non-reactive oxides such as cobalt oxide, titania, zirconia, alumina as fillers.

Dip-Coating in Powder-Based Slurry, Curing and Inert Gas Sintering

In this embodiment, porous metal oxide particles having an average particle size of between 0.2 to 1 micrometers taken in amounts of 5 to 30 weight percent in a suitable solvent to form a slurry. The weight percent is based on the total weight of the metal oxide particles and the solvent. The solvent is not a solvent for the porous metal oxide particles but facilitates the formation of a slurry that can be easily applied to a surface of the porous substrate. A list of different solvents is provided below.

Liquid aprotic polar solvents such as propylene carbonate, ethylene carbonate, butyrolactone, acetonitrile, benzonitrile, nitromethane, nitrobenzene, sulfolane, dimethylformamide, N-methylpyrrolidone, or the like, or combinations thereof are generally desirable for dissolving the template. Polar protic solvents such as, water, methanol, acetonitrile, nitromethane, ethanol, propanol, isopropanol, butanol, or the like, or combinations thereof may be used. Other non-polar solvents such a benzene, toluene, methylene chloride, carbon tetrachloride, hexane, diethyl ether, tetrahydrofuran, or the like, or combinations thereof may also be used to dissolve the template. Examples of preferred solvents are water, alcohols, tetrahydrofuran, acetone, or combinations thereof. Water is especially preferred for manufacturing the solvent.

A pre-wetted (in de-ionized water) porous substrate is dip-coated in the slurry, using an optimum immersion time, and lift-up speed. The as-formed coating will be dried at room temperature and atmospheric pressure, and thereafter will be at a temperature between 1920 and 2250° F. in an inert atmosphere to prevent oxidation of the underlying porous substrate. Inert atmosphere is preferably created by introducing an inert (e.g. $N_2$) or noble (e.g. Ar) gas into furnace hot-zone and maintaining either a positive or a partial pressure of the selected gas.

Chemically Bonded Composite Sol-Gel Coating, De-Binding and Sintering

Sol gel precursors may be catalyzed in a solvent and then used to coat the porous substrate. Sol gel precursors may include silica precursors (e.g., tetramethoxysilane, tetraethoxysilane, or the like), alumina precursors (e.g., sec aluminum butoxide), titania precursors (e.g., titanium isopropoxide), zirconia precursors (e.g., zirconium isopropoxide), or the like, or a combination thereof. The precursors may be mixed an organic solvent to form a solution. Organic solvents listed above may be used. Controlled addition of water and a peptizing agent such as a mineral acid ($HNO_3$) will yield a "Sol" that can be used as a vehicle. At this point, already prepared metal oxide particles may be added to the reacting solution to form a slurry. The already prepared metal oxide particles are at least one of silica, alumina, titania, zirconia, ceria, or the like, or a combination thereof.

The slurry may be used to coat the porous substrate. The porous substrate with the slurry disposed thereon may then be baked to a suitable temperature in the presence of an inert gas to produce the porous ceramic coating. This method of forming the porous ceramic coating on the porous substrate is detailed in the example below.

Sputtering Followed by Anodization

A layer of metal between 5 to 10 micrometers in thickness, may be sputter-coated on a porous substrate. Sputtering is done by a commonly used method such as physical vapor deposition (PVD), chemical vapor deposition (CVD), atomic layer deposition, or the like, or a combination thereof. The metals deposited by PVD, CVD, ALD, and the like is aluminum, titanium, zirconium, and the like.

The metal layer may also be produced by coating the porous substrate with a metal salt coating. The porous substrate with the metal salt coating is dried and is then subjected to a reducing atmosphere at an elevated temperature. The salt is reduced to a metal thus obtaining a metal coated porous substrate. Metal salts are preferably salts of titanium, aluminum, zirconium, cerium, or the like, or a combination thereof. Examples of salt are titanium chloride, aluminum nitrate, aluminum chloride, titanium nitrate, zirconium chloride, zirconium nitrate, or the like, or a combination thereof. The reducing atmosphere preferably includes hydrogen.

After the formation of a metal layer on the surface of the porous substrate, anodization may be performed on the metal layer to produce a porous metal oxide layer to produce the porous metal oxide coating on the porous substrate. The anodization occurs in an electrolytic bath with the porous substrate being used as the anode. The porous metal oxide coating is then heat treated at an elevated temperature of greater than 300° C., preferably 400 to 700° C., preferably 400 to 600° C. to form the porous ceramic coating on the porous substrate.

Metal Oxide Nanostructured Coating Formed by Hydrothermal Process

Modification of porous substrates can be conducted by forming metal oxide nanostructures on their surfaces by using a hydrothermal process, which can impart various surface functionalities including enhancement of either hydrophilic or hydrophobic moieties on the surface. The hydrothermal process comprises of placing a porous substrate in a Teflon (polytetrafluoroethylene) lined stainless-steel vessel (i.e., autoclave) filled with either of the following: 1. A transition metal salt (e.g. titanium tetrachloride, tetrabutyl titanate, etc.) and a strong inorganic (e.g., hydrochloric acid) solution (acid method) or 2. A transition metal oxide powder (e.g., submicron size $TiO_2$ powder) in a concentrated basic (e.g., NaOH) solution (alkali method).

Thereafter, the autoclave is exposed to heat for a period of time 6 to 30 hours, resulting in a temperature between 70 and 240° C. and the resulting high vapor pressure. After the heat exposure, the autoclave is cooled down to room temperature to yield a porous substrate coated with metal oxide nanostructure. To protect porous substrates such as porous stainless steel from reacting/corroding, a metal oxide (e.g., $TiO_2$) coating may first be applied and thereafter the coated porous substrate may be dipped in acid (e.g., a nitric acid solution) in an autoclave and exposed to heat to facilitate the hydrothermal process whereby transformation of the compact $TiO_2$ coating to a nanostructured $TiO_2$ coating can occur.

Metal Oxide Nanostructured Coatings Formed by Thermal Oxidation

Thermal oxidation of valve metals such as Ti, Nb, Zr and Ta in an oxygen containing atmospheres (e.g., air, pure oxygen and mixture of gases with oxygen as a component), within a range of temperature and for an appropriate length of time, can form metal oxide nanostructures such as nanowires and nanorods on the surface. Such nanostructures increase surface roughness. The resulting increase of rough surface can enhance either the hydrophilic nature or the hydrophobic nature of a surface, i.e., a hydrophilic surface will become more hydrophilic, and a hydrophobic surface will become more hydrophobic depending upon the treatment.

Surface engineering of porous metal substrates by thermal oxidation leading to enhancement of hydrophilic or hydrophobic nature, is not claimed in any patent and not reported in any technical literature. While bare valve metals can be directly modified by thermal oxidation to form nanostructures, other metals and alloys including iron, stainless steel, nickel and its alloys and cobalt and its alloys, can also be surfaced engineered, first by sputtering a layer of a valve metal and thereafter oxidizing the resulting surface to form metal oxide nanostructures.

Thermal oxidation based nanostructured coatings are advantageous because they can be formed using low-cost and scalable methods, can be used to tune surface energy (hydrophilic or hydrophobic) of the substrate, enhance corrosion resistance, do not shed particulates, and strong adhere to the underlying porous substrate.

The porous coatings are expected to be abrasion resistant and last at least one year in microscale organic and inorganic solid particles filtration operations at temperatures of 350 and 400° C., wherein the filtrate may be characterized by high, low or intermediate pH, and may fall within a range of viscosity. In an embodiment, the porous coating can have stoichiometric refractory oxides or compounds of these oxides that can resist corrosive, erosive and abrasive environments and (2) being able to sinter the coating on the substrate at lower temperatures and at higher pO2 than hitherto used for applying these coatings on metal substrates which resulted in a reduced oxide layer.

The porous substrates with the coatings disposed thereon are exemplified by the following non-limiting examples.

Example 1

This example demonstrates the formation of an alumina sol gel coating on the porous substrate. Alumina sol may be purchased commercially or prepared by using precursor metal salts or metal alkoxides. For example: alumina sol may be prepared by adding 306 g (1.5 M) aluminium isopropoxide $Al(iOCH(CH_3)_2)_3$ to 3 L of deionized water (@ pH 4, adjusted by adding 1 M $HNO_3$), stirring the mixture vigorously for 16 hours at 858° C. until the resulting bluish-white suspension turns to a clear sol, and evaporating excess solvent slowly from the sol until its concentration becomes 1 M. Thereafter, a slurry mix is formed by adding 20 to 40 g of alumina powder (of desired size distribution) to 100 ml of the alumina sol and 2 to 3 drops of octanol (defoamer), followed by ball-milling.

Viscosity of the mix is adjusted by adding water during ball-milling. The porous substrate is dip-coated in the resulting slurry mix. with a draw up rate of 1-2 mm/s. The as-dip-coated porous substrate is dried at room temperature and then heat treated around 400 to 800° C. for 3 hours to burn off organics and sinter-bind the coating. After the formation of the coating, the coated porous substrate is dipped in a solution of 10% monoaluminum phosphate followed by 10% phosphoric acid.

Coated porous substrates are dipped coated and then subjected to a second stage of heat-treatment to form chemical bonded (with porous substrate) porous polymerized monoaluminum phosphate coating. Using the same recipe, alumina sol and alumina powder may be replaced by titania sol and titania powder to form $TiO_2$ coating, which may be dried, dipped in 10% phosphoric acid solution, and sintered at temperatures between 400 and 600° C. to form chemically bonded titanium pyrophosphate ($TiP_2O_7$) coatings. Thickness of the coatings depends on loading (weight percent) of powder and pore-size depends on particle size distribution of powder and sintering temperature.

Example 2

Figure 2A:
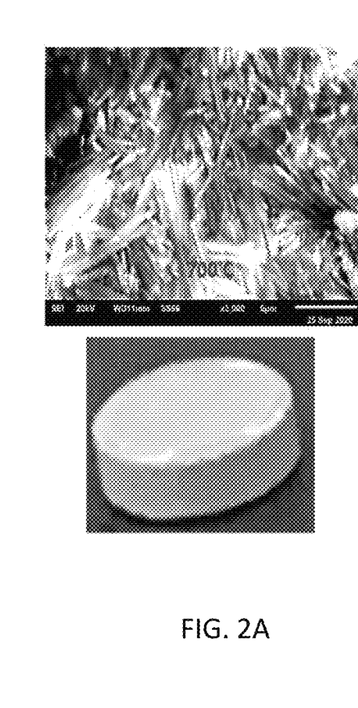
FIG. 2A (upper row) depicts $TiO_2$ nanowires formed on a Ti surface by thermal oxidation in air at 700° C. while (lower row) shows that the nanowires enhance hydrophilic nature of the surface resulting in wide-spreading of the water-droplet.

An example of a metal oxide nanostructured coating is the titanium dioxide ($TiO_2$) nanowires (See FIG. 2A (top)), formed by a thermal oxidization of porous titanium discs. Temperature for thermal oxidation that results in formation of the nanowire is between 675° C. and 725° C., and the oxidation was conducted in an atmosphere of ambient air. Time duration for thermal oxidation is between 2 hours and 10 hours. Generally, a longer time duration can lead to longer nanowires but after a duration of time the nanowires will coalesce and lose their nanostructure morphology by forming of a thicker scale.

Figure 2B:
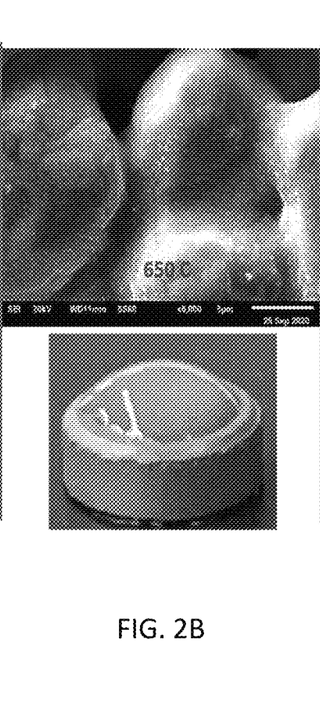
FIG. 2B (upper row) depicts a rough $TiO_2$ layer formed by thermal oxidation in air 650° C. and (lower row) shows that the rough $TiO_2$ layer enhances hydrophilic nature but to a limited extend as compared with the nanowire coated surface in FIG. 2A.
Figure 2C:
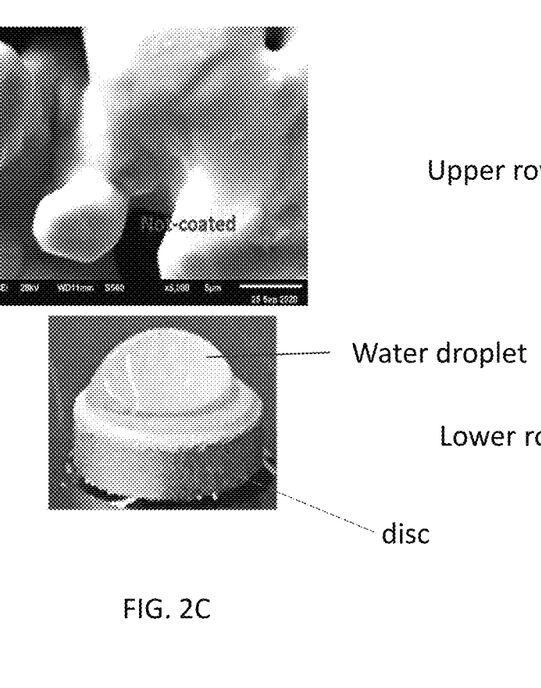
FIG. 2C (upper row) depicts an unoxidized titanium surface while the (lower row) shows that the least spreading of the water droplet occurs when compared with the surfaces in the FIGS. 2A and 2B.

Presented in the top row of FIGS. 2A, 2B and 2C are SEM images showing nanowire-like morphology (See FIG. 2A), which is obtained by thermal oxidation of porous Ti discs in the above-mentioned range of temperature; a rough surface (See FIG. 2B) produced by oxidation at a temperature below 675° C. and above 600° C.; and an un-oxidized and smooth porous titanium surface (See FIG. 2C). In the FIGS. 2A, 2B and 2C (bottom-row) it may be seen that a water droplet spreads more on the titanium discs oxidized at 700° C. and 650° C. than in the bare (i.e., not oxidized) titanium discs.

Example 3

An example of a ceramic coating is a $TiO_2$ base membrane-type coating on a stainless steel substrate. The composition of the titanium dioxide base coating obtained from x-ray photoelectron spectroscopy (XPS) data, is about 69% $TiO_2$ and 31% $Ti_2O_3$. The XPS spectrum for $Ti_2p$ is presented in FIG. 3.

Figure 3:
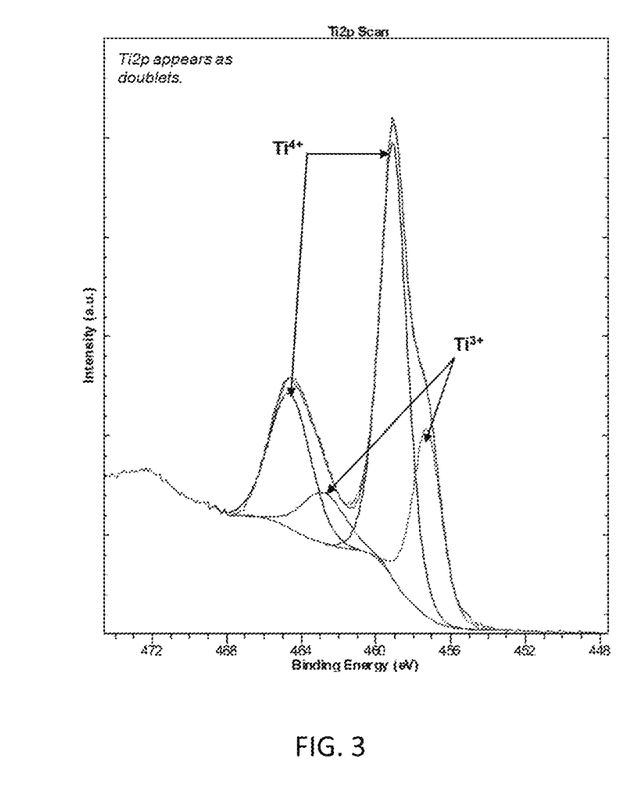
FIG. 3 depicts photoelectron spectroscopy spectra for a titanium dioxide coating on a stainless steel substrate.

This chemistry/composition differs from that of a similar coating by Graver, which does not have any $TiO_2$ and/or $Ti_2O_3$, but has non-stoichiometric titanium oxides, primarily $Ti_4O_7$, along with $Ti_2O_3$ and $Ti_6O_{11}$. Uniqueness of the titanium dioxide coating arises from its processing/sintering in inert atmosphere which tends to maximize content of stoichiometric form of $TiO_2$. On the other hand, if the titanium dioxide coating is sintered in a reducing atmosphere (for example an atmosphere containing hydrogen or forming gas), $TiO_2$ can undergo reduction reaction to form oxygen vacancies resulting in non-stoichiometric titanium oxide products. FIG. 3 shows EDS line-scan data of the $TiO_2$ coating, which confirms presence of titanium and oxygen in the coating. Such coatings are strongly adherent to the substrate, do not shed particulates and have good abrasion resistance. When applied to porous metals filters, such membrane-type coatings can aid in liquid filtration processes by increasing filtration efficiency and can also extend their usage time by decreasing/preventing colloidal fouling.

As seen in the Example 2, the porous ceramic coating can comprise stoichiometric amounts of different oxides of a metal. In an embodiment, the metal is titanium and the metal oxide comprise 50 to 80 wt %, preferably 65 to 75 wt % of $TiO_2$ and 20 to 50 wt %, preferably 28 to 33 wt % of $Ti_2O_3$, based on the total weight of the metal oxide.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A porous membrane comprising:
a porous substrate;
a porous ceramic coating disposed on the porous substrate; where an average pore size of pores in the porous substrate are larger than an average pore size of pores in the porous coating; and wherein fabricating the porous membrane is conducted at a temperature less than an oxidation temperature of the substrate, while not reducing any existing oxide coating on the membrane or wherein fabricating the membrane is conducted in an inert atmosphere with low air/oxygen partial pressures and at temperatures between 400 and 1200° C. and wherein the oxygen partial pressure is from $10^{-9}$ atm to $10^{-3}$ atm;
wherein the porous ceramic coating comprises different oxides of the same metal, and the metal is titanium;
wherein the different oxides are $TiO_2$ and $Ti_2O_3$; and
wherein the metal oxide comprises 50 to 80 wt % of $TiO_2$ and 20 to 50 wt % of $Ti_2O_3$, based on the total weight of the metal oxide.

2. The porous membrane of claim 1, where the porous substrate has a thickness that is greater than the thickness of the porous coating.

3. The porous membrane of claim 1, where the porous substrate has an average pore size of 0.1 to 100 micrometers.

4. The porous membrane of claim 1, where the porous ceramic coating has an average pore size of 0.05 nanometers to 5 micrometers.

5. The porous membrane of claim 1, where the porous ceramic coating covers a portion of a cell present in the porous substrate.

6. The porous membrane of claim 1, where the porous substrate comprises a metal, a metal alloy, a glass, a ceramic or a cermet.

7. The porous membrane of claim 1, where the porous substrate comprises stainless steel.

8. The porous membrane of claim 1, where the porous substrate and the porous ceramic coating have a different chemical composition from each other.

9. The porous membrane of claim 1, where the porous ceramic coating further comprises a nitride, a carbide, a silicate, a titanate, a zirconate, or a combination thereof.

10. The porous membrane of claim 1, where the porous ceramic coating further comprises a metal nitride, a metal carbide, a silicate, a titanate, a zirconate, an aluminate, or a combination thereof.

11. The porous membrane of claim 1, where the metal oxide comprises 69 wt % of $TiO_2$ and 31 wt % of $Ti_2O_3$, based on the total weight of the metal oxide.

12. The porous membrane of claim 1, where the porous ceramic coating is manufactured by anodization of a metal layer disposed on the porous substrate.

13. The porous membrane of claim 1, where the porous ceramic coating is manufactured from an enamel frit-based composition.

14. The porous membrane of claim 1, wherein the metal oxide comprises 65 to 75 wt % of $TiO_2$ and 20 to 33 wt % of $Ti_2O_3$, based on the total weight of the metal oxide.

15. A method of manufacturing the porous membrane of claim 1, the method comprising:
disposing a titania precursor on the substrate; and
manufacturing the porous membrane below an oxidation temperature of the substrate, while not reducing any existing oxide coating on the membrane; or
manufacturing the membrane in an inert atmosphere with low air/oxygen partial pressures and at temperatures between 400 and 1200° C.; wherein the oxygen partial pressure is from $10^{-9}$ atm to $10^{-3}$ atm.

16. The method of claim 15, where the porous substrate comprises a metal, a metal alloy, a glass, a ceramic or a cermet.

17. The method of claim 15, where the porous ceramic coating comprises a metal oxide, a metal nitride, a metal carbide, a silicate, a titanate, a zirconate, an aluminate, or a combination thereof.

18. The method of claim 15, where the oxidation occurs via thermal oxidation.

19. The method of claim 15, where the oxidation occurs via hydrothermal oxidation.

20. The porous membrane of claim 1, where the porous ceramic coating protrudes into a portion of a cell present in the porous substrate.

21. The porous membrane of claim 1, where the porous ceramic coating does not protrude into a portion of a cell present in the porous substrate.

\* \* \* \* \*